May 14, 1974 H. M. RHODES 3,810,832
OIL/WATER SEPARATION ACCELERATION MEDIA
Filed June 1, 1972 2 Sheets-Sheet 1
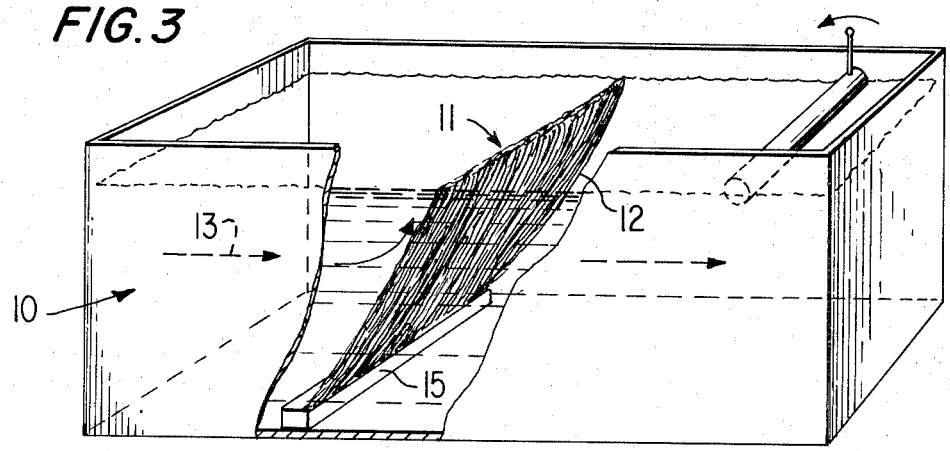
FIG. 3
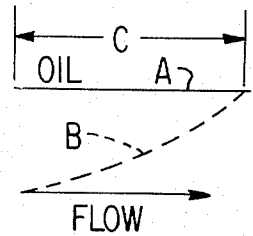
FIG. 1
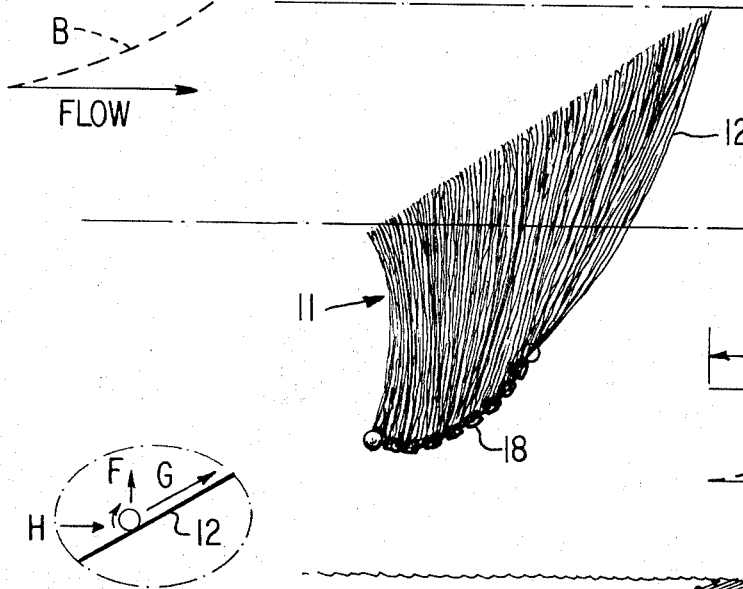
FIG. 4
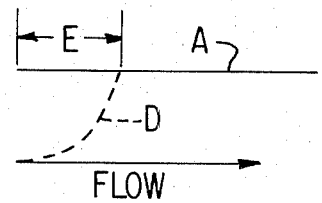
FIG. 2
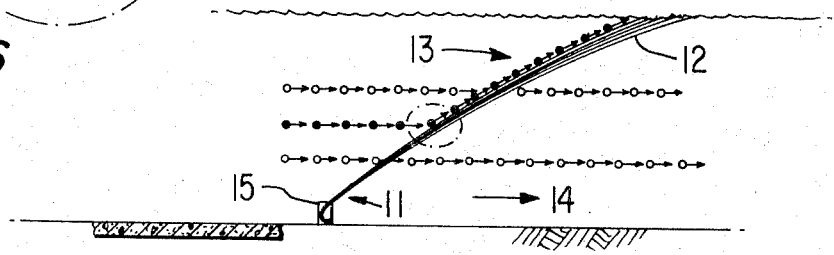
FIG. 6
FIG. 5

3,810,832
OIL/WATER SEPARATION ACCELERATION MEDIA
Herbert M. Rhodes, New Orleans, La., assignor to
Oil Mop, Inc., New Orleans, La.
Filed June 1, 1972, Ser. No. 258,506
Int. Cl. B01d 17/02; E02b 15/04
U.S. Cl. 210—23      6 Claims

ABSTRACT OF THE DISCLOSURE

The present disclosure is directed to an apparatus for accelerating the separation of oil from an oil/water mixture to bring the oil to the surface over as short a linear distance as possible in a linear flow of a mixture of oil and water by directing the oil/water mixture through a barrier of filaments of polypropylene arranged across the path of mixture flow which barrier is anchored at its base at the bottom of the fluid confining means such as an API oil separator or a ditch or canal with the free ends of the strips of polypropylene directed upwardly forming an inclined plane up which the oil droplets amalgamate assisted by the buoyancy of the oil and the force flow vector of the mixture passing through the fluid confining means.

---

An object of the present invention is to accelerate the separation of oil from an oil/water mixture as quickly as possible over as short a linear distance of travel of an oil/water mixture to shorten the tanks, dams or other fluid confining means through which the mixture will pass.

A further object of the present invention is the provision of a barrier of filaments of polypropylene or the like anchored at their base and free at their other ends which barrier may be anchored at its base end in an API separator tank and skimmer or dropped across a drainage ditch or canal so that the free ends of the strips of polypropylene will float upwardly and be inclined by the rate of current flow of the mixture to allow the oil to rise through its natural buoyancy plus taking advantage of the horizontal force of the mixture flow to push an amalgamated rop of oil up the inclined plane of the polypropylene strips of the barrier.

The affinity of oil to polypropylene and the like material in strip form is taught and described in my copending patent application Ser. No. 52,448, filed July 6, 1970 entitled An Oil Mop and Method of Using Same, now U.S. Pat. No. 3,668,118.

A still further object of the present invention is to provide an oil separation accelerator which may be placed in the path of flow of an oil/water mixture which employs fibrillated polypropylene or the like which increases the surface area per pound of material of a given gauge thickness to afford more oil adsorbing media to attract more oil to it and which because of being anchored at its bottom end and free at its top end will form with the flow current of the mixture an inclined plane up which the oil will rise to the surface at a more rapid rate than that of the oils own natural buoyancy reacting with the rate of current flow of the mixture.

With the foregoing and other objects in view the invention will be more fully described hereinafter and more particularly pointed out in the appended claims.

In the drawings in which like parts are denoted by reference characters throughout the several views:

FIG. 1 is a diagrammatic showing of an amalgamated drop of oil rising to the surface of a mixture of oil and water only of its own buoyancy against the current of the flow of the mixture.

FIG. 2 is a view similar to FIG. 1 with the added effect of the acceleration media of the present invention.

FIG. 3 is a diagrammatic view of an API separator through which flows mixture of oil and water in the path of flow of which has been interposed the oil accelerating media of the present invention.

FIG. 4 is a perspective view of a barrier of oil accelerating media having an anchor chain secured to its bottom to conform to the irregularities of a drainage ditch or canal.

FIG. 5 is a diagrammatic view of the path of flow of oil along and up to a barrier of fibrillated polypropylene constructed in accordance with the present invention.

FIG. 6 is a magnified schematic view of the path and vectors of a drop of oil taken at the elliptical area in FIG. 5.

Figure 7:
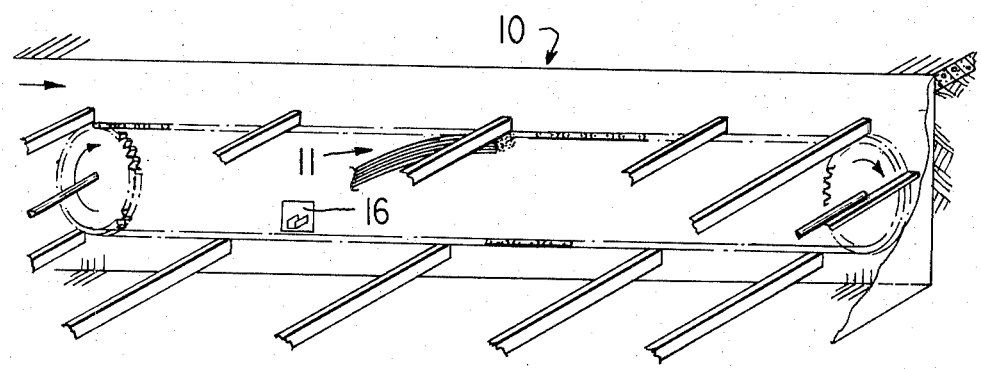
FIG. 7 is a diagrammatic view of an API skimmer having a barrier of oil accelerating separating media of the present invention installed therein.

Referring now to the drawings and more particularly to FIGS. 1 and 2, A designates the surface of an oil/water mixture and B designates the trajectory of an amalgamated oil drop seeking its way to the surface aided only by the inherent natural buoyancy of the oil reacting in water. The rise to the surface takes place in a linear or horizontal distance C along the path of flow of the mixture through an API separator or a drainage ditch or canal.

Again in FIG. 2 is shown the surface of an oil/water mixture wherein D designates the trajectory of an amalgamated oil drop rising to the surface of an oil/water mixture aided by the oil separation acceleration media of the present invention over a linear or horizontal distance E which is much shorter than the distance C which means that the length of the API separator 10, shown in FIG. 3 may be shortened when the barrier 11 of fibrillated strips of polypropylene or the like 12 are placed in the path of flow 13 of the oil/water mixture through the separator 10.

Referring now to FIGS. 5 and 6 the oil/water mixture flows to the barrier media 11 where the oil impinges on the petrophilic hydrophobic fibers 12 and the water 14 passes freely through the barrier 11 and beyond. Two forces enhance the oil's passage to the surface as shown in FIG. 6, the normal inherent buoyancy of the oil F with long residency time; and the vectoral force caused by the inclined plane G of fibers 12 working in conjunction with the force of the oil/water mixture velocity H.

Figure 8:
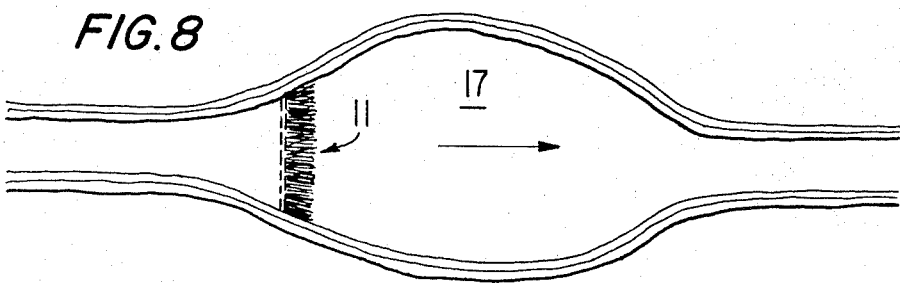
FIG. 8 is a top plan view of the oil separation accelerating media installed at the mouth of a holding pond.
Figure 9:
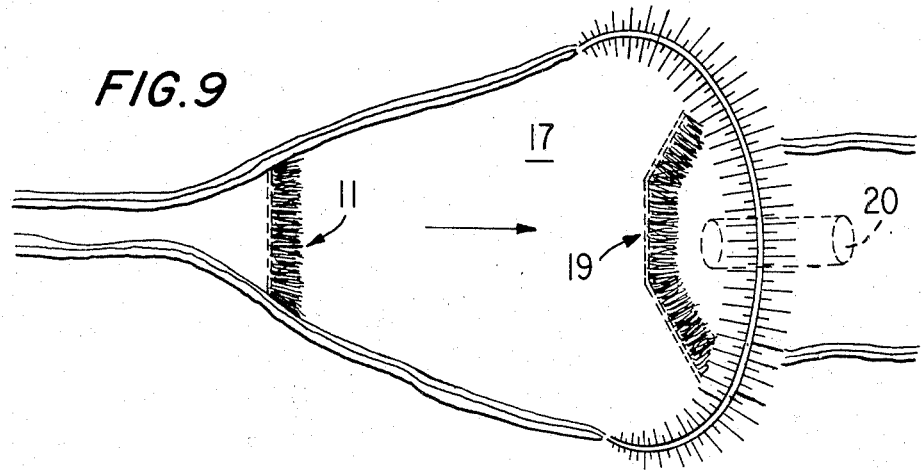
FIG. 9 is a view similar to FIG. 8 with the oil separation accelerating media installed in a holding pond having an inverted weir.

The oil separation acceleration media consists of the barrier 11 of petrophilic hydrophobic fibers 12 attached to a cross member 15 for mounting at 16 in the API separator 10, shown in FIG. 7, or other low velocity oil/water flow, as shown at 13 in FIGS. 8 and 9, to induce the oil to rise to the surface where it may be collected.

Performance of the media 11 is based on its ability to impede and coalesce or amalgamate oil entrained in a flowing stream of water, as shown in FIGS. 8 and 9, and let the water pass with little or no resistance. The fibers 12 in the media 11 are viscosity sensitive and produce superior results on the high viscosity oils which are usually found in effluents of oil operations. The light ends tend to evaporate off leaving the heavier residues.

Installation of the media 11 in an API separator without rakes is very simple, as shown in FIG. 3, without a shutdown and it will commence operation immediately. On API separators with rakes, as shown in FIG. 7, mount brackets 16 are required in order to mount the unit 11 cross member 15 right above the bottom rake haul chain. The media barrier 11 does not interfere with operation of the rake. On API separators with overhead rakes, or rake operated by mechanisms other than a haul chain, the barrier 11 may be installed the same as a separator without rakes, merely by dropping it in.

On holding ponds, drainage ditches or canals 17 the barrier media 11 is installed perpendicular as shown in FIGS. 4, 8 and 9, to the current flow so that it may bring the oil to the surface and allow the water to pass practically unimpeded. In such installations the bottom of the barrier 11 is secured to a length of anchor chain 18 which provides the weight necessary to take it to the bottom of the water way and to have the flexibility to conform to the irregularities of the bottom. Holding ponds using inverted weirs are especially suited to the barrier media of the present invention, since a curtain 19 of barrier media 11 can be formed around the weir 20 to mitigate the passage of oil to the effluent.

The term media herein means a barrier of fibrillated strips of petrophilic hydrophobic fibers of polypropylene.

The length of the filaments making up the barrier 11 depends upon the flow velocity of the oil water mixture into which the barrier is inserted. Where the velocity of flow is low the length of the filaments may be short and where velocity is high the filaments 12 may be long.

The term fluid confining means designates an API separator, a drainage ditch, canal or holding pond.

What is claimed is:

1. An oil/water separation acceleration media for use in a fluid confining means through which passes a mixture of oil and water comprising
   a barrier of elongated filaments of polypropylene arranged in said confining means across the flow of the mixture,
   anchoring means only at the base of the barrier to cause the base to sink in the mixture and the free ends of the filaments to rise due to the inherent buoyancy of said polypropylene forming an inclined plane up which the oil droplets amalgamate assisted by the buoyancy of the oil and the force flow vector of the mixture passing through the fluid confining means.

2. An oil/water separation acceleration media as claimed in claim 1 wherein the filaments forming the barrier are thin narrow gauge fibrillated strips of polypropylene.

3. An oil/water separation acceleration media as claimed in claim 2 wherein the barrier extends substantially across the base of the width of the fluid confining means and the fibrillated polypropylene extends along the length of the barrier.

4. An oil/water separation acceleration media as claimed in claim 1 wherein the anchoring means at the base of the barrier is a length of anchor chain and the fluid confining means is a ditch or drainage canal.

5. An oil/water separation acceleration media as claimed in claim 1 wherein the filaments forming the barrier are long strips of narrow gauge polypropylene of the order of two inches in width.

6. The method of accelerating the separation of oil from an oil/water mixture passing through a fluid confining means comprising erecting a barrier media of fibrillated polypropylene strips weighed only at one end through which the water will pass and up which the oil will be conducted augmented by the oil's inherent natural buoyancy and the natural buoyancy of the polypropylene strips, and anchoring the barrier across the flow of the oil/water mixture at the base of the fluid confining means.

References Cited

UNITED STATES PATENTS

| | | | |
|---|---|---|---|
| 3,558,482 | 1/1971 | De Young | 210—23 |
| 3,537,587 | 11/1970 | Kain | 210—242 |
| 3,700,593 | 10/1972 | Bezemer et al. | 210—40 |

SAMIH N. ZAHARNA, Primary Examiner

T. G. WYSE, Assistant Examiner

U.S. Cl. X.R.

210—40, 170, Dig. 5, Dig. 21